US011932500B2

(12) United States Patent
Larramore et al.

(10) Patent No.: US 11,932,500 B2
(45) Date of Patent: Mar. 19, 2024

(54) LOAD FORMER HAVING STORAGE/WORK AREA

(71) Applicant: A. G. Stacker Inc., Weyers Cave, VA (US)

(72) Inventors: Kennedy Sullivan Larramore, Staunton, VA (US); Eric Stempihar, Rockingham, VA (US); Joseph Wunder, Lexington, VA (US); Jerry Blosser, Crimora, VA (US); Randall Donn Senger, Mount Sidney, VA (US)

(73) Assignee: A. G. STACKER INC, Weyers Cave, VA (US)

( * ) Notice: Subject to any disclaimer, the term of this patent is extended or adjusted under 35 U.S.C. 154(b) by 0 days.

(21) Appl. No.: 18/100,805

(22) Filed: Jan. 24, 2023

(65) Prior Publication Data

US 2023/0249924 A1    Aug. 10, 2023

Related U.S. Application Data

(60) Provisional application No. 63/306,795, filed on Feb. 4, 2022.

(51) Int. Cl.
| | | |
|---|---|---|
| *B65G 57/10* | (2006.01) | |
| *B65G 57/00* | (2006.01) | |
| *B65G 57/24* | (2006.01) | |
| *B65H 29/34* | (2006.01) | |

(52) U.S. Cl.
CPC ......... *B65G 57/245* (2013.01); *B65G 57/005* (2013.01); *B65G 57/10* (2013.01); *B65H 29/34* (2013.01); *B65H 2701/1822* (2013.01)

(58) Field of Classification Search
CPC .... B65G 57/245; B65G 57/005; B65G 57/10; B65G 57/24; B65H 29/34; B65H 2701/1822; F16M 1/00; B23Q 11/0891
USPC ....................................... 312/270.3
See application file for complete search history.

(56) References Cited

U.S. PATENT DOCUMENTS

| | | | | |
|---|---|---|---|---|
| 4,600,249 | A * | 7/1986 | Anderson | ........... E05B 73/0082 |
| | | | | 108/50.01 |
| 9,778,707 | B1 * | 10/2017 | San Clemente | ........ G06F 1/182 |
| 10,850,933 | B1 * | 12/2020 | Allen, Jr. | ................ B65H 29/34 |
| 10,934,108 | B1 | 3/2021 | Allen, Jr. et al. | |
| 2019/0300283 | A1 * | 10/2019 | Hellenbrand | ............ B65G 1/06 |

* cited by examiner

*Primary Examiner* — Lynn E Schwenning
(74) *Attorney, Agent, or Firm* — J-TEK LAW PLLC; Scott T. Wakeman; Jeffrey D. Tekanic (57) ABSTRACT

A load former includes a frame, a loading zone bounded on a first end by a stop wall having a stop surface lying in a plane and a rear wall at a rear side of the frame, and a cookie sheet slidably supported by the frame for travel along a path perpendicular to the plane. The path includes portions on first and second sides of the plane, and a portion of the cookie sheet in the second portion of the path defines a bottom of the loading zone. A platform extends over the first portion of the path, and a top wall is vertically spaced from the platform to define a storage space between the top wall and the platform. The storage space has a front opening so that it is accessible from the front of the load former.

19 Claims, 7 Drawing Sheets

LOAD FORMER HAVING STORAGE/WORK AREA

CROSS-REFERENCE

This application claims the benefit of U.S. Provisional Patent Application No. 63/306,795, filed Feb. 4, 2022, the contents of which are hereby incorporated by reference.

TECHNOLOGICAL FIELD

The present disclosure is directed to a load former having a space that can be used for storage and/or as a work area that is easily accessible by an operator of the load former.

BACKGROUND

Paperboard blanks can be produced by various machines including rotary die cut machines. These blanks exit the rotary die cut machine individually or a small number at a time and are then formed into small stacks or bundles in a known manner. These bundles must then be arranged into larger stacks on pallets for transport and storage.

For example, through known processes, the blanks may be formed into bundles of 20. If each bundle is 24 inches long by ×20 inches wide, four of these bundles can be arranged in a layer having a footprint that corresponds to the 40×48 inch surface of a standard pallet. Assuming each of the bundles is 12 inches high, four to eight of these layers can be stacked one on top of another to form a 48 inch to 96 inch tall stack on the pallet. The dimensions of a standard pallet may be discussed herein, but bundles having different dimensions and/or bundles arranged in different patterns in a layer or on a pallet having different dimensions can also be formed.

While the stacks could be formed completely manually, that is, by having a worker placing each of the bundles on a pallet in a pattern and then stack additional bundles on top of the first layer, this process is inefficient and it can be difficult to form a final stack that is square. Therefore devices known as "load formers" are used to partially automate this process.

Figure 1:
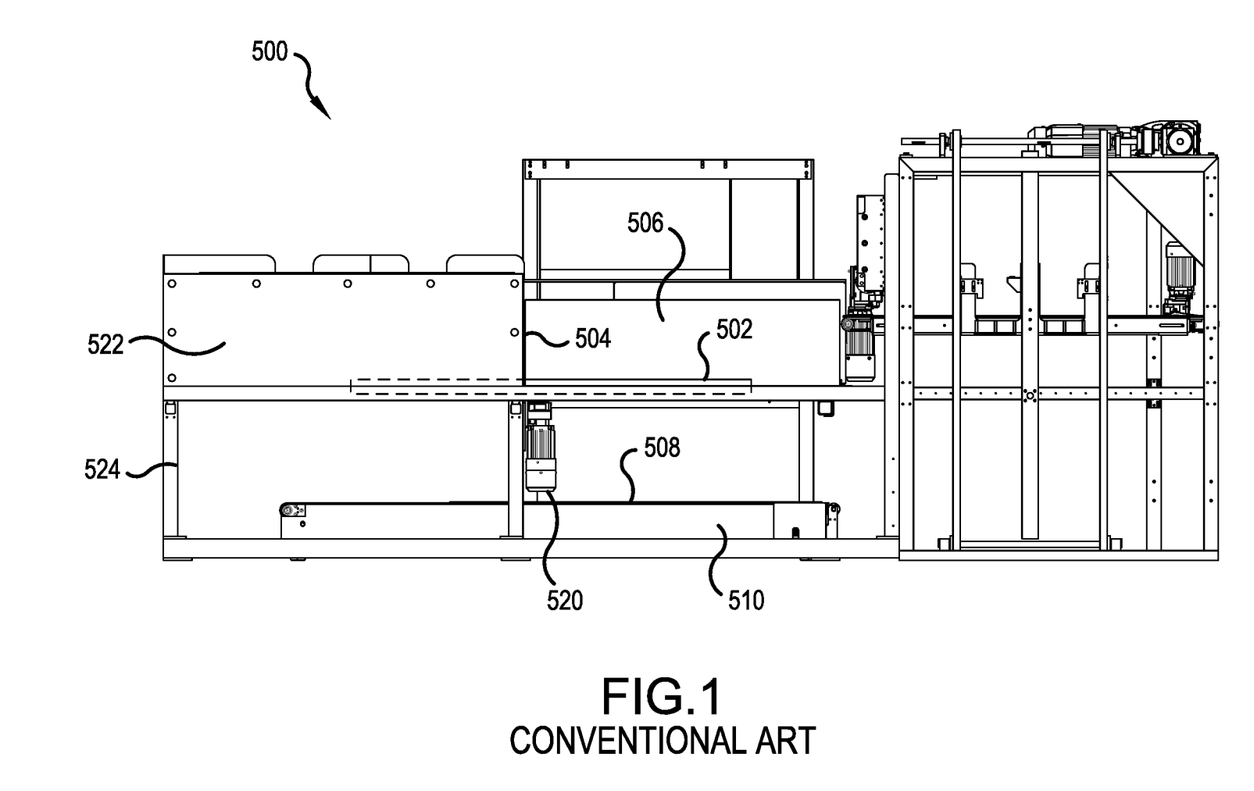
FIG. 1 is a schematic side elevational view of a conventional load former.

A conventional load former 500 is schematically illustrated in FIG. 1. The load former 500 includes a movable horizontal platform 502, sometimes referred to in the art as a "cookie sheet," that extends through or past a vertical stop wall 504 and that is bordered at a rear side by a vertical backstop 506.

In operation (FIG. 2), the bundles B arrive at an operator location 516 on a supply conveyor 514, and a worker at the operator location 516 lifts and/or slides the bundles B from the supply conveyor 514 to the cookie sheet 502 and orients the bundles B on the cookie sheet 502 to form a pattern of the bundles B that will become a layer in a stack on a pallet (not illustrated). For example, a first bundle B may be removed from the supply conveyor 514 and moved to position I on the cookie sheet 502 in contact with the stop wall 504 and the backstop 506, a second bundle II may be placed against the first bundle I and the backstop 506, a third bundle III may be placed against the first bundle I and the stop wall 504 and a fourth bundle IV may be placed against the second bundle II and the third bundle III. The illustrated bundles are square; when the bundles are rectangular, the worker must ensure that the bundles are properly oriented in addition to being properly positioned.

With these four bundles in place, the worker presses a button (not illustrated) or otherwise generates a signal to cause a drive 520 to retract the cookie sheet 502 through or past the stop wall 504 to deposit the four bundles onto a support conveyor 508. The support conveyor 508 is mounted on a lift table 510 which allows the support conveyor to be moved between a lowered position illustrated in FIG. 1 and a raised position immediately below the cookie sheet 502 to receive the bundles B as the cookie sheet 502 retracts. A controller (not illustrated) causes the lift table 510 to lower the support conveyor 508 by a given amount, slightly more than the height of the layer of bundles B, and then re-extend the cookie sheet 502 past the stop wall 504 so that a subsequent layer of bundles can be formed thereon. When the stack on the support conveyor 508 reaches a desired height, the support conveyor 508 discharges the finished stack onto a take-away conveyor (not illustrated) and the process begins again.

For safety reasons, panels including a front panel 522 are provided on the machine frame 524 to substantially enclose the region upstream of the load forming area (to the left of the load-forming area in FIG. 1). If the front panel were to be removed, the portion of the cookie sheet 502 to the left of the stop wall 504 would be exposed and could potentially injure an operator or other person near the machine when the load former 500 operates.

FIG. 1 shows the cookie sheet 502 partially retracted with the portion of the cookie sheet 502 that lies to the right of the stop wall 504 visible and the portion of the cookie sheet to the left of the stop wall 504 hidden behind the front panel 522 and shown with dashed lines. The front panel 522 prevents a person or other objects from coming into contact with the moving cookie sheet 502 when it retracts into the space to the left of the stop wall 504. While the load former 500 functions adequately for its intended purpose, improvements are still possible.

SUMMARY

A first embodiment of the present disclosure comprises a load former with a frame having a first end and a second end and a front side and a rear side. A loading zone is bounded on a first end by a stop wall having a stop surface lying in a plane and a rear wall at the rear side of the frame; the loading zone is open at the front side of the frame. A cookie sheet is slidably supported by the frame for travel along a path perpendicular to the plane, and the path includes a first portion on a first side of the plane and a second portion on a second side of the plane. A portion of the cookie sheet in the second portion of the path defines a bottom of the loading zone. A platform is supported by the frame and extends over the first portion of the path, and a top wall is vertically spaced from the platform to define a storage space between the top wall and the platform. The storage space has a front opening at the front side of the frame such that is accessible from the front side of the frame.

BRIEF DESCRIPTION OF THE DRAWINGS

An embodiment of the present disclosure is described below in connection with the attached drawings wherein.

DETAILED DESCRIPTION

Figure 2:
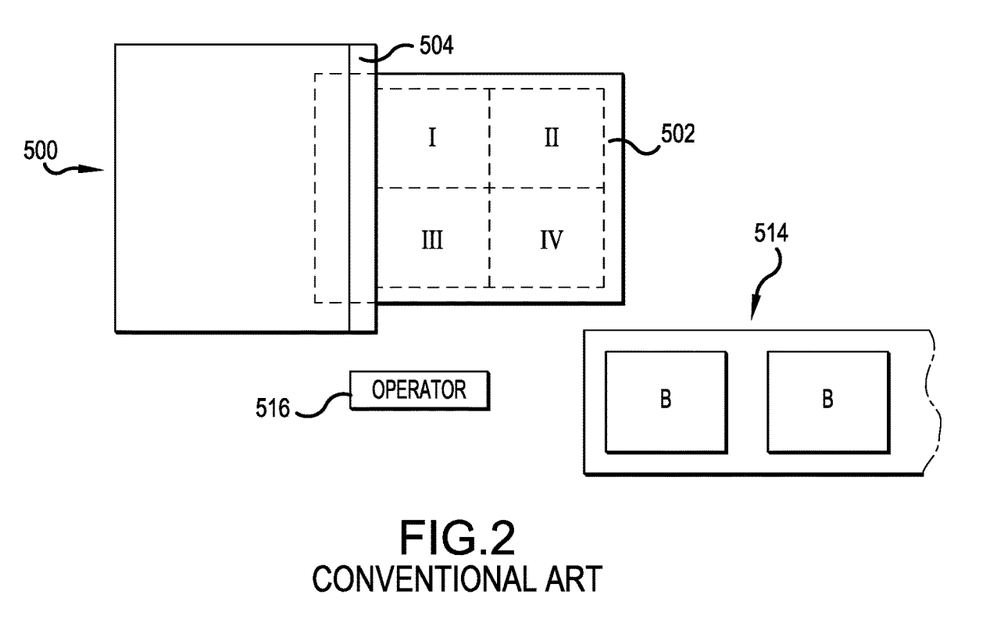
FIG. 2 is a schematic top plan view of the conventional load former of FIG. 1.
Figure 3:
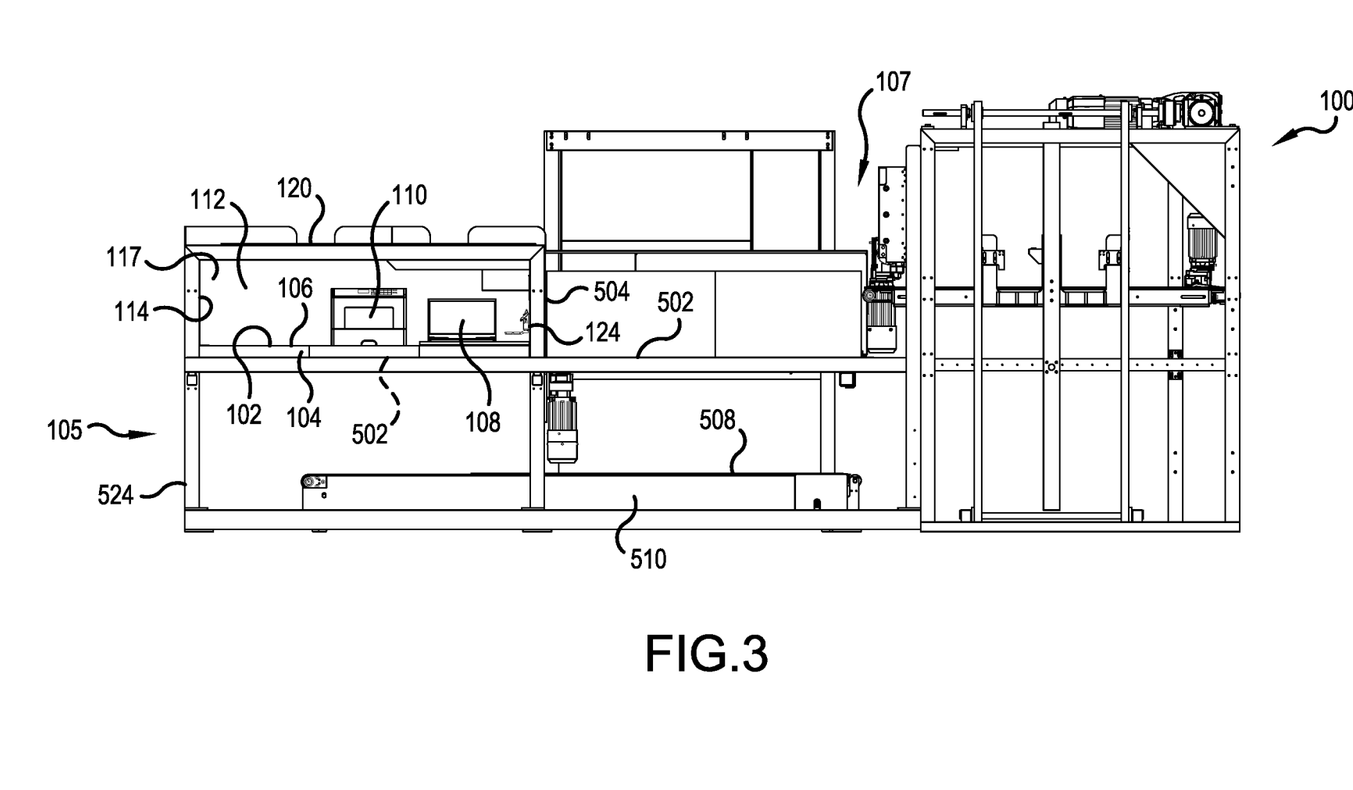
FIG. 3 is a side elevational view of a load former according to a first embodiment of the present disclosure.

FIG. 3 shows a load former 100 according to a first embodiment of the present disclosure. Elements common to the conventional load former of FIGS. 1 and 2 are identified with the same reference numerals. The load former 100 includes a front side 101 at which an operator stands (at location 516) to place bundles B on the cookie sheet 502, a rear side 103 opposite the front side 101, a left end 105 and a right end 107.

Figure 4:
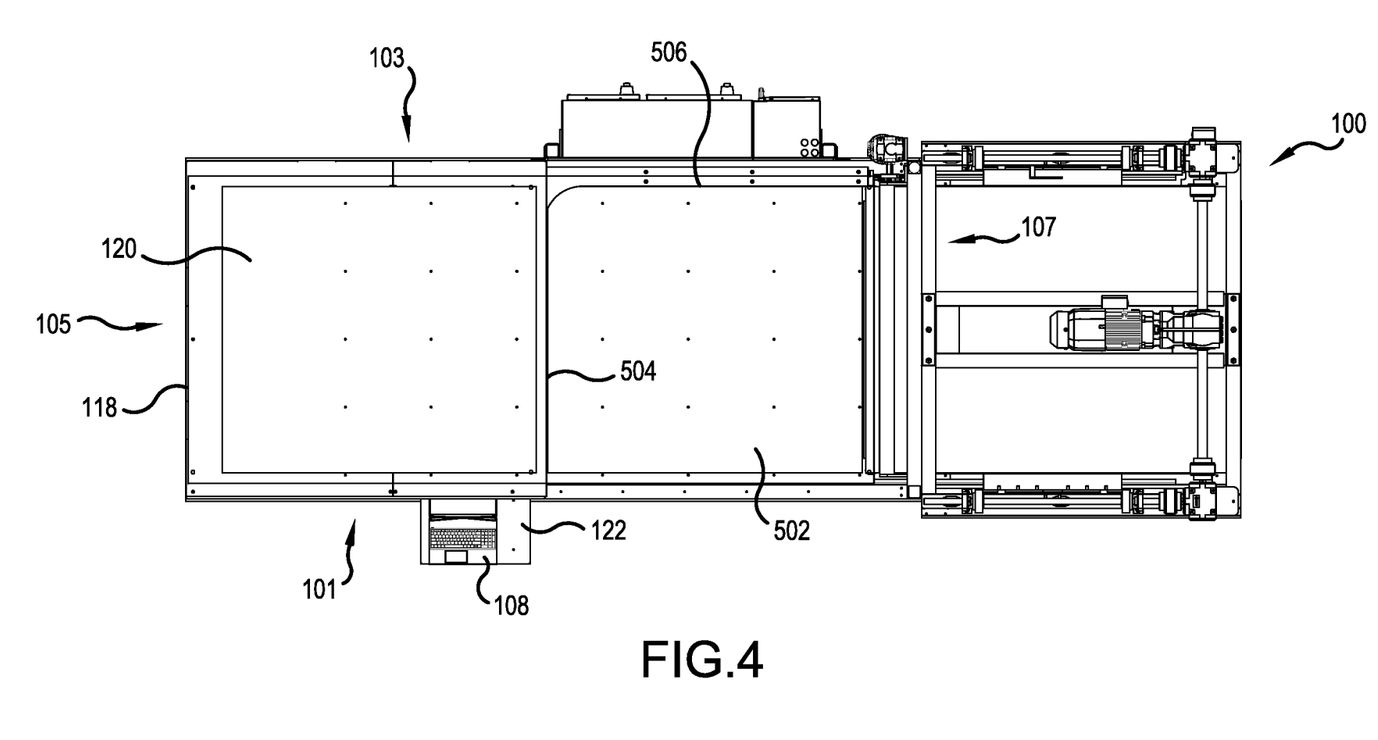
FIG. 4 is a top plan view of the load former of FIG. 3.
Figure 5:
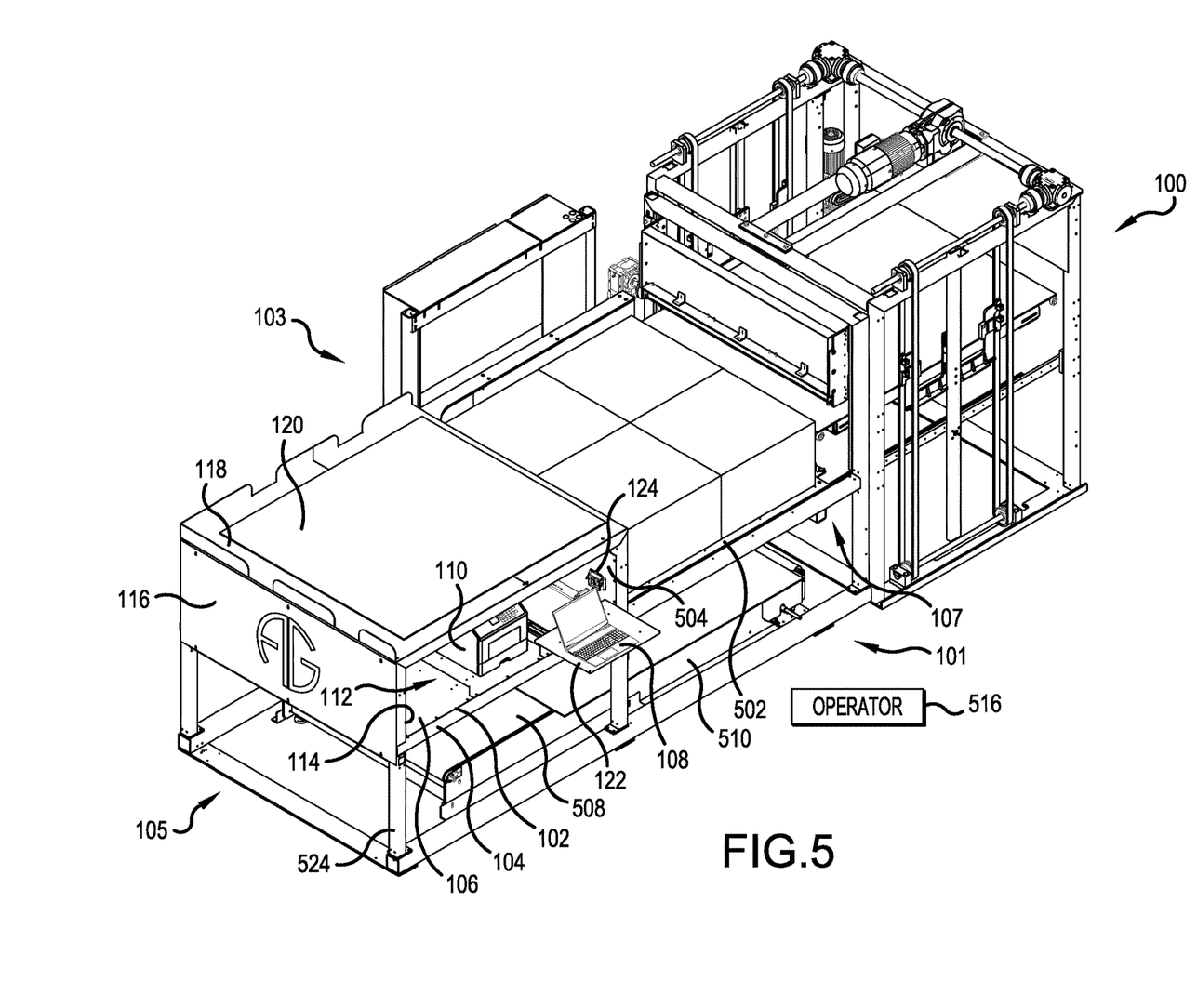
FIG. 5 is a perspective view of the load former of FIG. 3.

As will be apparent from FIG. 3, the load former 100 lacks a front panel 522. Instead, in order to prevent accidental contact with the moving cookie sheet 502 when it travels to the left side of the stop wall 504, a horizontal protective cover 102 is mounted to the frame 524 over the cookie sheet path which cover 102 includes a vertical side wall portion 104 and a top surface 106. The top surface 106 of the cover 102 forms a floor to support and/or store objects such as a computer 108 and printer 110 as illustrated in FIGS. 3-5. The load former 100 thus provides a storage space 112 that can be accessed via a front opening 114. Of course, objects other than a computer or printer can be stored in the storage space 112, and the storage space 112 can function as a work space even if no objects are permanently stored therein.

The storage space 112 may be open or closed on the left and rear sides. For example, a left side panel 116 is visible in FIG. 5, and an optional rear panel 117 is shown in FIG. 3. The storage space 112 may also be closed on the top by an optional top wall 118 that is used to support tie sheets 120 (sheets that are placed between some layers of the bundles to increase friction and stabilize the load). However, when a more open work space is desired and/or when secure storage is not required, the rear panel 117 and/or the side panel 116 may be omitted.

While the storage space 112 may comprise substantially all the vertical space between the path of the cookie sheet 502 and the top wall 118, that is, it may extend from the front side 101 of the load former 100 to the rear side 103 of the load former 100, in the alternative, the storage space 112 may occupy only a portion of the space between the path of the cookie sheet 502 and the top wall 118 if room is needed to accommodate motors or other functional elements of the load former 100. For example, the rear wall 117 may be located at the rear side 103 of the load former 100 or at a location between the front side 101 and the rear side 103 of the load former 100.

Regardless of the location of the rear wall 117, the storage space extends at least part way over (above) the portion of the path followed by the cookie sheet 502 that is to the left of the stop wall 504 so that the cookie sheet 502 moves back and forth under the storage space 112 when the load former 100 operates.

Optionally, the cover 102 can support one or more slidable shelves 122; a single slidable shelf 122 is illustrated. A top of the slidable shelf 122 may form a writing surface or be used to support an item such as the computer 108 shown mounted on the slidable shelf 122 in FIGS. 4 and 5. In addition, electrical and/or network connections 124 can be provided in the storage space 112 to allow easy connections for the computer 108 and the printer 110 or other electronic and/or computer devices.

The cookie sheet 502 is mounted at a height that is easy for an operator to access as bundles are placed thereon. The top surface 106 of the storage space is located slightly higher than the top of the cookie sheet (by 0.5 to 2 inches, for example) and is therefore also located at a convenient work height for the operator.

Figure 6:
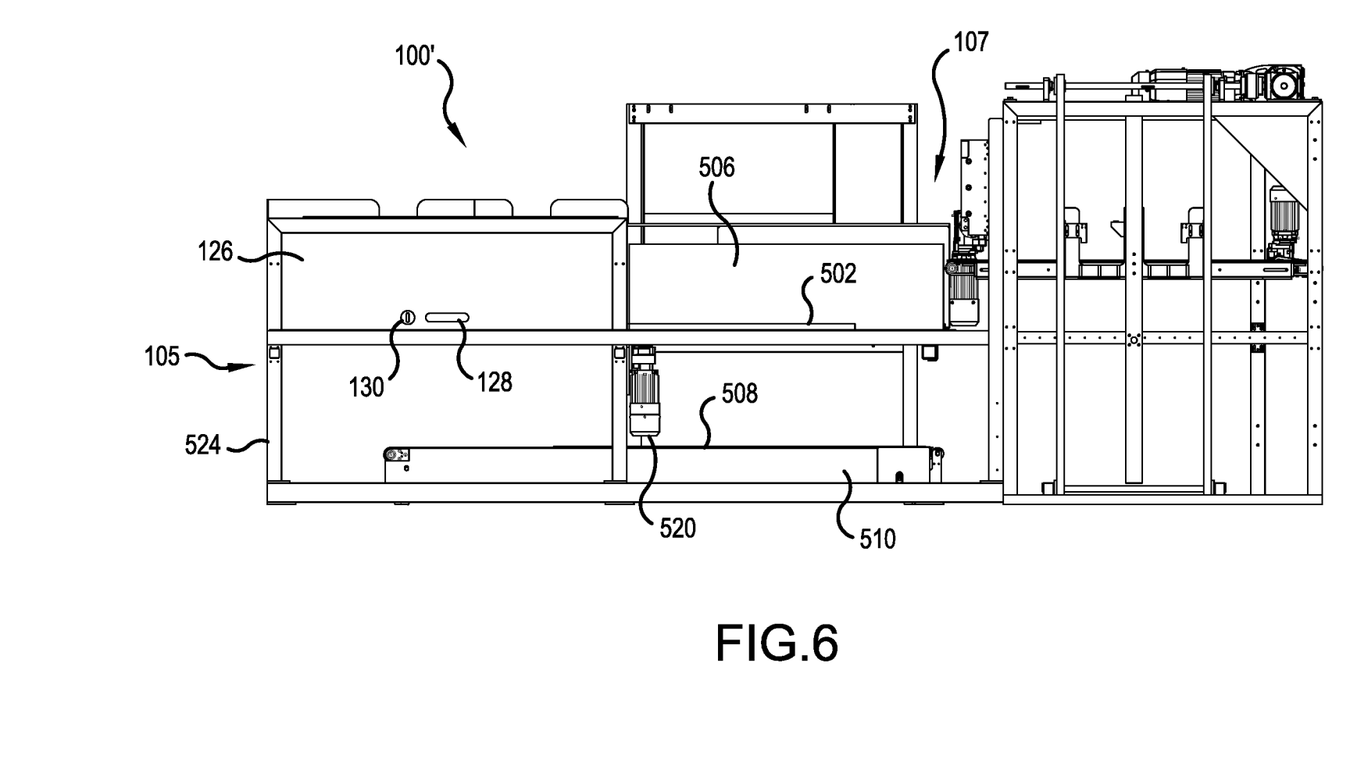
FIG. 6 is a perspective view of a load former according to a second embodiment of the present disclosure.

The storage space 112 may optionally be closable by a cover such as a door. FIG. 6 illustrates a second embodiment of a load former 100' that includes a flip-up door 126 with a handle 128 and a lock 130. The door 126 is pivotably mounted to the machine frame 524 along its top edge (like the door of a lateral filing cabinet) such that the door 126 can be opened by pulling the handle 128 away from the machine frame 524 and pivoting the door 126 until it is horizontal and then sliding the door 126 horizontally into the front opening 114 to store the 126 door at a distance above the top surface 106.

Figure 7:
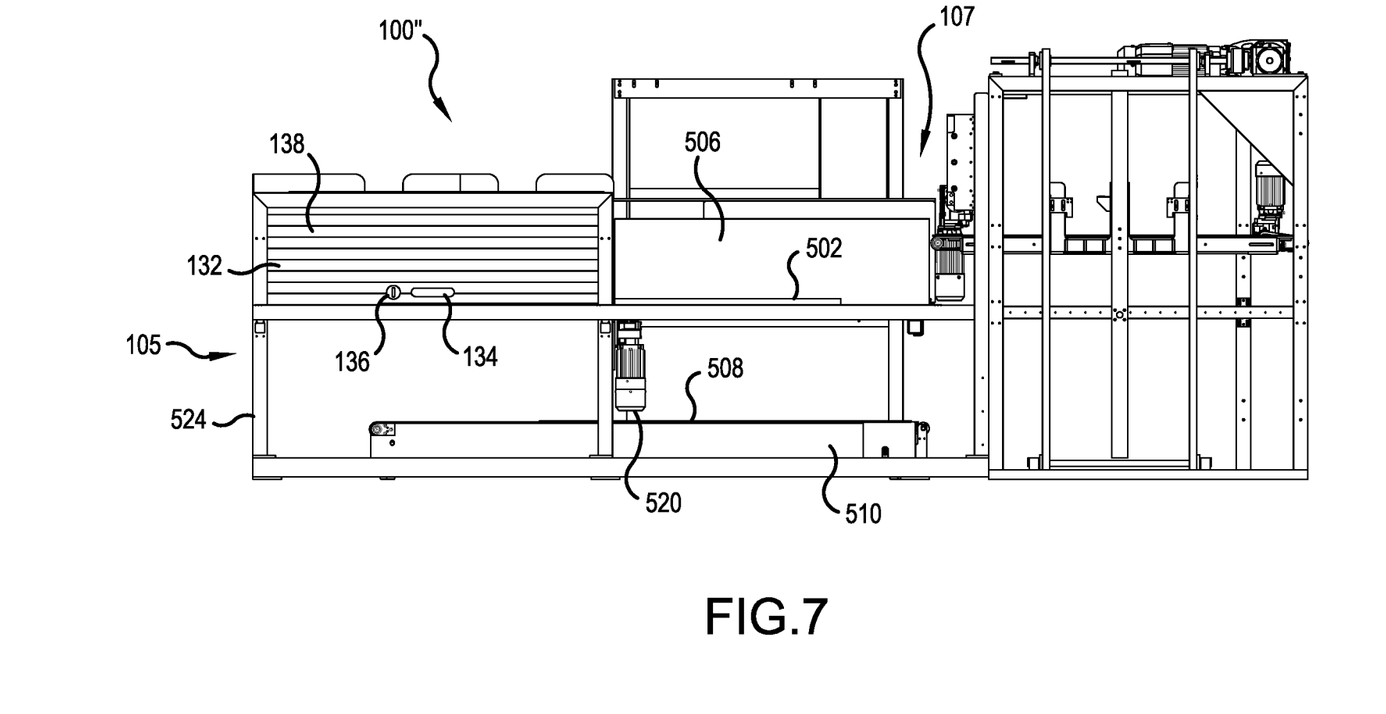
FIG. 7 is a perspective view of a load former according to a third embodiment of the present disclosure.

FIG. 7 illustrates a third embodiment of a load former 100" that includes a door 132 having a handle 134 and a lock 136. The door 132 is a roll-up door (similar to a door of a roll-top desk) and includes a plurality of hingedly connected horizontal panels 138 that allow the door 132 to curve as it is lifted from the vertical position illustrated in FIG. 7 to a horizontal position (not illustrated) at a distance above the top surface 106. Other types of covers or doors, such as sliding doors or accordion-style sliding doors (not illustrated) could also be used.

The present invention has been described herein in terms of presently preferred embodiments. Modifications and additions to these embodiments will become apparent to persons of ordinary skill in the art upon a reading of the foregoing disclosure. It is intended that all modifications and additions to these embodiments form a part of the present invention to the extent they fall within the scope of the several claims appended hereto.

What is claimed is:

1. A load former comprising:
   a frame having a first end and a second end and a front side and a rear side;
   a loading zone bounded on a first end by a stop wall having a stop surface lying in a plane and a rear wall at the rear side of the frame, the loading zone being open at the front side of the frame;
   a cookie sheet slidably supported by the frame for travel along a path perpendicular to the plane, the path including a first portion on a first side of the plane and a second portion on a second side of the plane, a portion of the cookie sheet in the second portion of the path defining a bottom of the loading zone;
   a platform supported by the frame and extending over the first portion of the path; and
   a top wall vertically spaced from the platform to define a storage space between the top wall and the platform, wherein the storage space has a front opening at the front side of the frame such that the storage space is accessible from the front side of the frame.

2. The load former according to claim 1,
   including covering means for selectively closing the storage space.

3. The load former according to claim 2,
   wherein the covering means comprise a roll-up door or a flip-up door.

4. The load former according to claim 1,
   including a computer or a printer mounted on the platform in the storage space.

5. The load former according to claim 1,
including at least one shelf slidably supported by the frame for movement from a first location above the cookie sheet to a second location projecting out of the front opening.
6. The load former according to claim 1,
including at least one shelf pivotably supported by the frame for pivoting movement from a first location above the cookie sheet to a second location projecting out of the front opening.
7. The load former according to claim 1,
including an electrical connector and/or a network connector in the storage space.
8. The load former according to claim 1,
including an electrical connector and/or a network connector in the storage space and mounted to a wall extending over the cookie sheet.
9. The load former according to claim 1, including:
a door for selectively covering the storage space;
an end wall at the first end of the frame and parallel to the plane, the end wall defining a first side of the storage space;
a rear wall perpendicular to the plane and perpendicular to the platform, the rear wall defining a back of the storage space;
at least one shelf slidably supported by the frame for movement from a first location above the cookie sheet to a second location projecting out of the front opening; and
an electrical connector and a network connector in the storage space mounted to a surface of the load former in the storage space.
10. The load former according to claim 9,
including a computer on the at least one slidable shelf.
11. A method comprising:
providing the load former according to claim 10;
opening the door to uncover the storage space;
sliding the at least one slidable shelf to the second location; and
typing on a keyboard of the computer.
12. The load former according to claim 1,
wherein the platform overlies the entire first portion of the path.
13. The load former according to claim 1,
including at least one wall perpendicular to the cookie sheet and delimiting the storage space in a first direction,
wherein the platform and the at least one wall are configured to prevent access to the cookie sheet via the front opening.
14. The load former according to claim 1,
including a rear wall defining a rear of the storage space,
wherein the platform extends from the front opening to the rear wall.
15. The load former according to claim 1,
wherein a storage space first side wall extends between the front side of the frame and the rear side of the frame, and
wherein the platform extends toward the first end of the frame from the storage space first side wall.
16. The load former according to claim 15,
wherein the storage space first side wall is the stop wall.
17. The load former according to claim 1,
including a storage space first side wall extending between the front side of the frame and the rear side of the frame and a storage space second side wall at the first end of the frame and a storage space rear wall extending from the storage space first side wall to the storage space second side wall,
wherein the platform extends from the front side of the frame to the rear wall and from the first side wall to the second side wall.
18. The load former according to claim 17,
wherein the storage space rear wall is located between the front side of the frame and the rear side of the frame.
19. The load former according to claim 1,
including an electrical connector and/or a network connector mounted to a surface of the load former in the storage space.

* * * * *